(12) United States Patent
Locke

(10) Patent No.: US 6,871,453 B2
(45) Date of Patent: Mar. 29, 2005

(54) MODULAR BUILDING CONNECTOR

(76) Inventor: Reginald A. J. Locke, 915 Douglass St., San Francisco, CA (US) 94114

( * ) Notice: Subject to any disclaimer, the term of this patent is extended or adjusted under 35 U.S.C. 154(b) by 0 days.

(21) Appl. No.: 10/394,891

(22) Filed: Mar. 19, 2003

(65) Prior Publication Data

US 2004/0182016 A1 Sep. 23, 2004

(51) Int. Cl.$^7$ ................................................. E04B 1/41
(52) U.S. Cl. .................. 52/79.13; 52/125.6; 52/223.13; 52/726.1
(58) Field of Search ............................. 52/79.13, 125.6, 52/726.1, 125.2

(56) References Cited

U.S. PATENT DOCUMENTS

| | | |
|---|---|---|
| 537,491 A | 4/1895 | Smith |
| 1,012,422 A | 12/1911 | Orewiler |
| 1,012,423 A | 12/1911 | Orr |
| 1,188,485 A | 6/1916 | Pruyn |
| 1,280,516 A | 10/1918 | Megenity |
| 1,786,631 A | 12/1930 | Roe |
| 2,074,566 A | 3/1937 | Sheils |
| 3,579,758 A | 5/1971 | Regan |
| 3,758,998 A | 9/1973 | Ollis et al. |
| 3,782,061 A | 1/1974 | Minutoli et al. |
| 3,965,627 A | 6/1976 | Fencl |
| 3,999,355 A | 12/1976 | Stucky |
| RE29,223 E * | 5/1977 | Pritulsky ..................... 439/260 |
| 4,037,914 A * | 7/1977 | Fetzer ......................... 439/502 |
| 4,081,936 A | 4/1978 | Wise |
| 4,161,089 A | 7/1979 | Omansky |
| 4,230,050 A | 10/1980 | Mays |
| 4,294,051 A | 10/1981 | Hughes, Jr. |
| 4,512,421 A | 4/1985 | Ogahara |
| 4,527,375 A | 7/1985 | Braginetz |
| 4,563,852 A | 1/1986 | Achtenberg et al. |
| 4,694,621 A | 9/1987 | Locke |
| 4,706,428 A | 11/1987 | McCoy et al. |
| 4,718,209 A | 1/1988 | Hansen et al. |
| 4,919,122 A | 4/1990 | Kohlenbrenner |
| 5,015,128 A | 5/1991 | Ross, Jr. et al. |
| 5,056,289 A | 10/1991 | Colen |
| 5,138,808 A | 8/1992 | Bengtson et al. |
| 5,197,245 A | 3/1993 | Davis |
| 5,497,841 A | 3/1996 | Cox et al. |
| 5,630,301 A | 5/1997 | Sieg |
| 6,190,091 B1 * | 2/2001 | Byle ........................ 405/224.4 |

FOREIGN PATENT DOCUMENTS

| | | | |
|---|---|---|---|
| AT | 186397 | 8/1955 | |
| EP | 428353 A1 * | 5/1991 | ......... H01R/13/621 |
| EP | 0 378 523 B1 | 3/1993 | |
| FR | 12340 | 8/1910 | |
| FR | 1455379 | 9/1966 | |
| FR | 2 635 550 | 8/1988 | |
| GB | 170033 | 10/1921 | |
| RU | 633997 | 11/1978 | |

OTHER PUBLICATIONS

The Innovative Structural Solution; 4 pages from the Modulock System Internationa, Ross, CA; Copyright 1991.

* cited by examiner

Primary Examiner—Peter M. Cuomo
Assistant Examiner—Stephen D'Adamo
(74) Attorney, Agent, or Firm—Knobbe, Martens, Olson & Bear, LLP

(57) ABSTRACT

A building construction is provided, including a plurality of connectors. Each of the connectors has an upper portion, a lower portion, a flange extending outwardly between the upper portion and the lower portion, and an axial bore extending through the connector from the upper portion to the lower portion. The upper portion and the lower portion define sloped bearing surfaces. The connectors are positioned between a plurality of building structural members. The upper and lower portions of the connectors extend into recesses in the structural members having sloped walls corresponding to the sloped bearing surfaces of the connectors. A tensioner extends through the bores of the connectors to connect the structural members. The bearing surfaces of at least two of the connectors have different slopes.

18 Claims, 5 Drawing Sheets

MODULAR BUILDING CONNECTOR

FIELD OF THE INVENTION

The invention relates to modular building connection systems for reinforcing buildings.

BACKGROUND OF THE INVENTION

Modular building connection systems are used to reinforce buildings against external forces, such as those experienced during earthquakes or severe weather. One example of a modular building connection system is disclosed in U.S. Pat. No. 4,694,621 issued to Locke, which is incorporated by reference herein. The system includes a number of connectors, each having a conical upper portion, a conical lower portion, a central flange, and an axial bore. The connectors are positioned between various structural members of the building. Conical recesses are provided in the structural members to engage the upper and lower portions of the connectors. A tensioner is provided through the bores of the connectors to connect the structural members together.

As described in the Locke patent, the connection system effectively translates external lateral forces on the building into axial forces, which are absorbed by the tensioner. The tensioner acts as a shock absorber, increasing the ability of the building to absorb and withstand external forces.

One problem with the connection system disclosed in Locke is that connectors located in certain areas of the building are likely to be subjected to much greater forces than connectors located in other areas of the building. For example, connectors positioned near the bottom of the building may be subjected to greater weight forces than connectors positioned near the top of the building. As a result, when external forces are applied to the building, some connectors may move more than other connectors. Building deformation is thus unbalanced and more difficult to predict, making reasonably accurate computer modeling of the building more difficult.

Accordingly, a need exists for an improved modular building connection system which achieves a more balanced and predictable building deformation in response to externally applied forces.

SUMMARY OF THE INVENTION

An improved modular building connection system is disclosed, including a plurality of connectors having bearing surfaces of different slopes. The different slopes of the bearing surfaces help to compensate for the different forces encountered by the connectors at various locations of the building.

In accordance with one aspect of the present invention, a building construction is provided, comprising a plurality of connectors. Each of the connectors has an upper portion, a lower portion, a flange extending outwardly between the upper portion and the lower portion, and an axial bore extending through the connector from the upper portion to the lower portion. The upper portion and the lower portion define sloped bearing surfaces. The bearing surfaces of at least two of the connectors have different slopes. The connectors are positioned between a plurality of building structural members. The upper and lower portions of the connectors extend into recesses in the structural members having sloped walls corresponding to the sloped bearing surfaces of the connectors. A tensioner extends through the bores of the connectors to connect the structural members.

In accordance with another aspect of the present invention, a building construction is provided, comprising a first pair of building structural members and a second pair of building structural members above the first pair. A first connector is positioned between the first pair of structural members. The first connector comprises an upper portion defining an upper bearing surface, a lower portion defining a lower bearing surface, a flange extending outwardly from the first connector between the first pair of structural members, and a bore extending axially through the first connector from the upper portion to the lower portion. A second connector is positioned between the second pair of structural members in axial alignment with the first connector. The second connector comprises an upper portion defining an upper bearing surface, a lower portion defining a lower bearing surface, a flange extending outwardly between the second pair of structural members, and a bore extending axially through the second connector from the upper portion to the lower portion. A tensioner extends through the bore of the first connector and the bore of the second connector. At least one of the upper and lower bearing surfaces of the second connector has a greater slope than the corresponding upper or lower bearing surface of the first connector.

In accordance with yet another aspect of the present invention, a method of constructing a building is provided. The method includes positioning a plurality of connectors between a plurality of structural members of the building. Each of the connectors has an upper portion, a lower portion, a flange extending outwardly between the upper portion and the lower portion, and an axial bore. Each of the upper and lower portions defines a sloped bearing surface. The bearing surfaces of some of the connectors have different slopes than the bearing surfaces of other connectors. Tensioners are then provided through the bores of the connectors to connect the structural members. These tensioners can be adjusted according to computerized design analysis to effectively "tune" the building structure to better resist destructive forces including harmonic vibrations.

DETAILED DESCRIPTION OF THE PREFERRED EMBODIMENT

Figure 1:
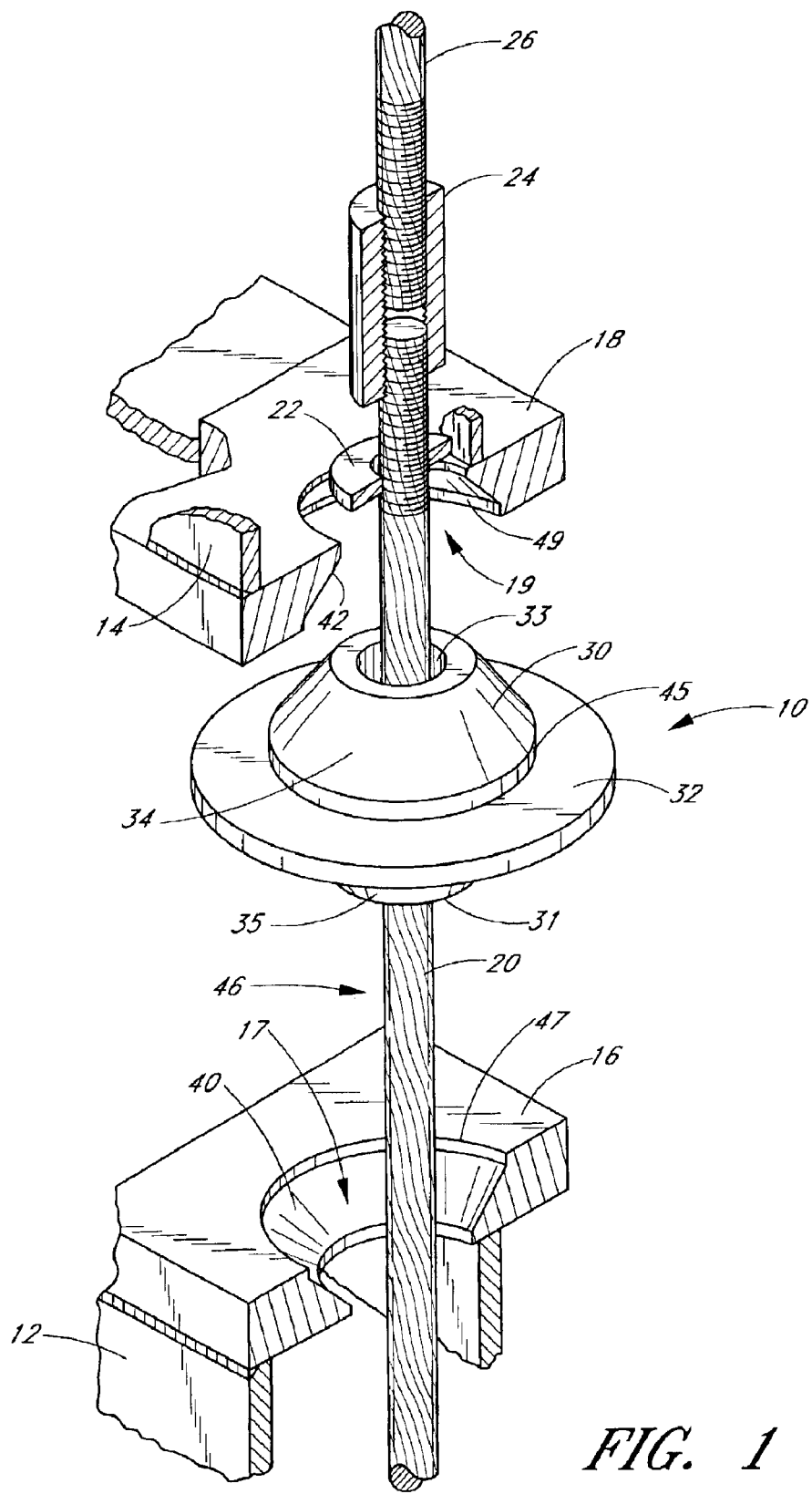
FIG. 1 is an exploded perspective view of a preferred embodiment of a building connection system.

With reference to FIG. 1, a connector 10 is illustrated having an upper portion 30, a lower portion 31, and a flange 32 extending outwardly between the upper portion 30 and the lower portion 31. A bore 33 extends axially through the connector 10 from the upper portion 30 to the lower portion 31.

Figure 2:
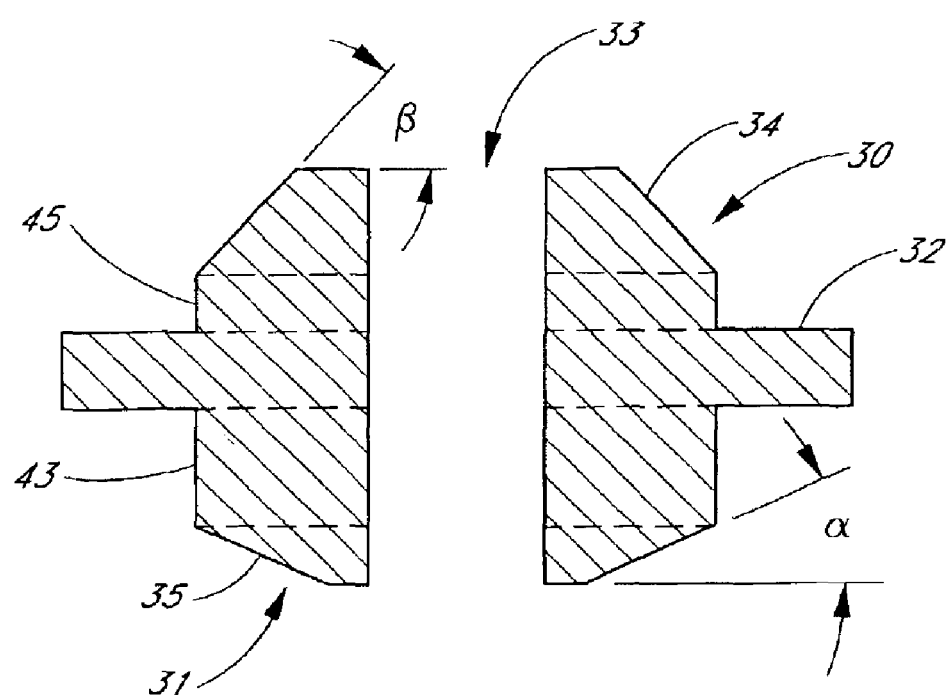
FIG. 2 is a cross-sectional view of the connector of the building connection system of FIG. 1.

As best illustrated in FIG. 2, in the embodiment shown, the upper and lower portions 30, 31 are generally conical. The upper portion 30 defines an upper bearing surface 34 and upper vertical portion 45, and the lower portion defines a lower bearing surface 35 and lower vertical portion 43. The upper and lower bearing surfaces 34, 35 are sloped relative to the flange 32. In the connector of FIG. 2, the upper bearing surface 34 has a slope β relative to the flange 32, and the lower bearing surface 35 has a slope α relative to the flange 32. The connector 10 is preferably molded with a conventional sintered powder metal process to reduce production costs in comparison with machining. The powdered metal is amalgamated to be corrosion resistant and the bearing surfaces of the cone and mating plates are coated with Teflon to reduce friction.

Figure 3:
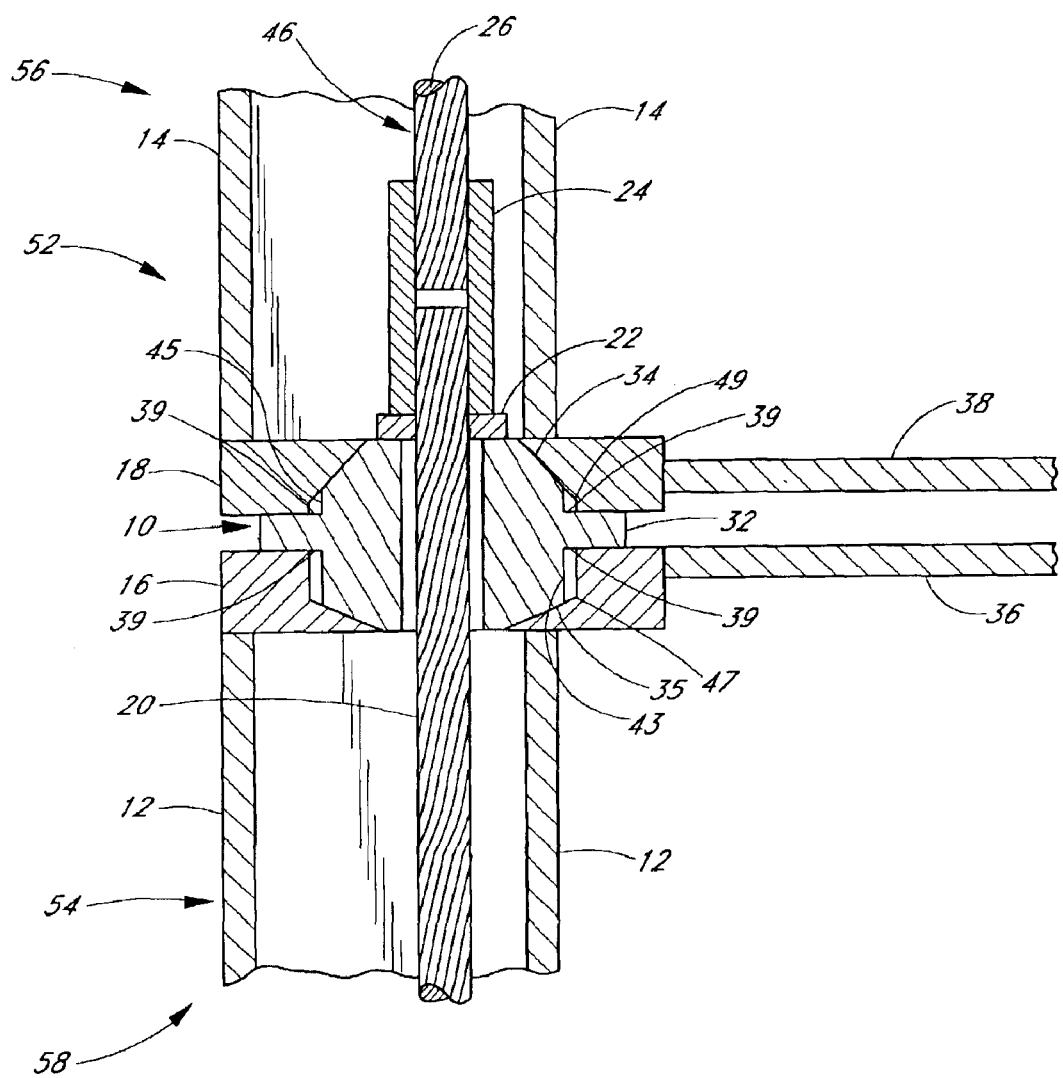
FIG. 3 is a cross-sectional view of the building connection system of FIG. 1.

In FIG. 3, the connector 10 is shown positioned between a pair of structural members 52, 54 of a building. The structural members 52, 54 may comprise, for example, elements of adjoining modules 56, 58 or stories of the building. In the illustrated embodiment, the structural members comprise tubes 12, 14 having plates 16, 18 welded to the ends thereof. The lower plate 16 is attached to a metal ceiling 36 of the lower module 58 of the building. The upper plate 18 is attached to a metal floor 38 of the adjacent upper module 56 of the building.

With reference again to FIG. 1, in the illustrated embodiment, the lower plate 16 includes a lower recess 17 having a sloped side wall 40 to accommodate the lower portion 31 of the connector 10. The upper plate 18 includes an upper recess 19, also having a sloped side wall 42, to accommodate the upper portion 30 of the connector 10. Preferably, the side wall of the lower recess 17 has a slope α corresponding to the slope of the lower bearing surface 35 of the connector 10, and the side wall of the upper recess has a slope β to correspond to the slope of the upper bearing surface 34 of the connector 10.

As illustrated in FIG. 3, a tensioner 46 extends through the bore of the connector 10 and through the tubes 12, 14 of the structural elements 52, 54. In the embodiment shown, the tensioner 46 comprises threaded high-tensile steel rods 20, 26 interconnected by a hexagonal coupler nut 24. The coupler nut 24 is threaded onto a top end of one of the rods 20. Preferably, a washer 22 is provided between the nut 24 and the top surface of the upper portion 30 of the connector 10. The coupler nut 24 is then tightened to apply tension to the rod 20.

The plate 18 of the upper structural member 52 abuts the flange 32 of the connector 10. Before or after the upper module 56 is in place on top of the lower module 58, a second rod 26 is extended through the tube 14 of the upper structural member 52 and into the top of the coupler nut 24. The process is then repeated for each succeeding module.

At various stages during construction of the building, the entire string of rods 20, 26 can be further tensioned, as desired. The coupler nuts 24 at each of the lower modules would thus be pulled up off their adjacent washers 22 due to further elongation of the rods 20, 26. The coupler nuts 24 would thus "float," and the string of rods 20, 26 would effectively act as a single rod, providing better shock absorbing characteristics. This would also serve to eliminate any eccentric forces at the coupler nuts 24.

As will be apparent to those skilled in the art, lateral movement of the upper module 56 relative to the lower module 58 causes a shearing force to be applied to the connector 10. The recesses 17, 19 (see FIG. 1) in the plates 16, 18 are sized to provide spaces 39 between the plates 16, 18 and the connector 10. The spaces 39 allow relative lateral movement of modules 56, 58. When the upper module 56 is moved laterally a sufficient distance relative to the lower module 58, the sloped side walls 40, 42 of the recesses 17, 19 abut the sloped bearing surfaces 34, 35 of the connector 10. Further relative lateral movement of the modules 56, 58 causes the side walls 40, 42 of the recesses 17, 19 (see FIG. 1) to slide along the bearing surfaces 34, 35 of the connector 10, thereby forcing the modules 54, 56 away from one another. This increases the tension in the tensioner 46, which acts as a shock absorber and forces the modules back together. The relative lateral movement of the modulus 56, 58 is limited by the vertical portions 45, 43 of connector 10 colliding with vertical portions 49, 47 of plates 18, 16. This limited relative movement of the modulus 56, 58 protects the tensioned rods 20, 26 from shear forces. Thus, the connector system serves to absorb and dissipate external forces applied to the building, such as by earthquakes or strong winds.

It will be understood that a number of connectors 10 of the type illustrated in FIGS. 1–3 will typically be positioned between each pair of building modules 56, 58. Each of the connectors 10 will typically be axially aligned with a number of other connectors 10 positioned between other pairs of building modules 56, 58 above and below.

Those skilled in the art will recognize that, because the connectors 10 are positioned at different locations throughout the building, the forces to which each of the connectors 10 will be subjected are likely also to differ. For example, connectors 10 positioned at the bottom modules of a building will likely support a greater mass than connectors 10 positioned at the top modules of the building. As a result, the magnitude of the external forces required to induce relative movement of adjacent modules near the bottom of the building will typically be more than the magnitude of the forces required to induce relative movement of adjacent modules near the top of the building, assuming a uniform tensile force along the length of the tensioner 46.

To account for the differing forces to which the various connectors 10 will be subjected, the connectors 10 can have bearing surfaces 34, 35 of different slopes. For example, connectors 10 having lesser-sloped bearing surfaces 34, 35 can be used at lower modules of the building, where they will be subjected to the weight of the rest of the building above. At progressively higher modules of the building, connectors 10 having bearing surfaces 34, 35 of progressively greater slopes can be used. The slopes of the side walls 40, 42 of the recesses 17, 19 will also vary to correspond to the slopes of the bearing surfaces 34, 35.

Preferably, the slope of only the lower bearing surface 35 is varied from connector 10 to connector 10. For example, the connector 10 of FIG. 2, which has a lower bearing surface 35 with a slope α of approximately 15° and an upper bearing surface 34 with a slope β of approximately 45° in the embodiment shown, might be positioned between adjacent building modules in a lower portion of the building. Connectors 10 having lower bearing surfaces 35 with progressively greater slopes would be positioned between adjacent building modules at progressively higher portions of the building. The optimal slopes for the bearing surfaces 34, 35 of the various connectors 10, and for the side walls 40, 42 of the corresponding recesses 17, 19, can be determined by computer modeling and empirically, by physical testing.

Those skilled in the art will recognize that, in alternative embodiments, the slope of the upper bearing surface 34 may be varied from connector 10 to connector 10, while the slope of the lower bearing surface 35 remains the same. In still other embodiments, the slopes of both the upper and lower bearing surfaces 34, 35 may be varied from connector 10 to connector 10.

By using connectors 10 with bearing surfaces 34, 35 of differing slopes, the magnitude of the lateral forces required to induce relative movement of adjacent modules at various locations of the building can be adjusted, as desired. Accordingly, the forces to which the various connectors 10 are subjected as the building is deflected, such as during earthquakes or in high winds, can be balanced. This facilitates analytical modeling of the building and increases the effectiveness of the connection system in absorbing and dissipating the kinetic energies generated in the building, making the building safer and more seismically sound.

Figure 4:
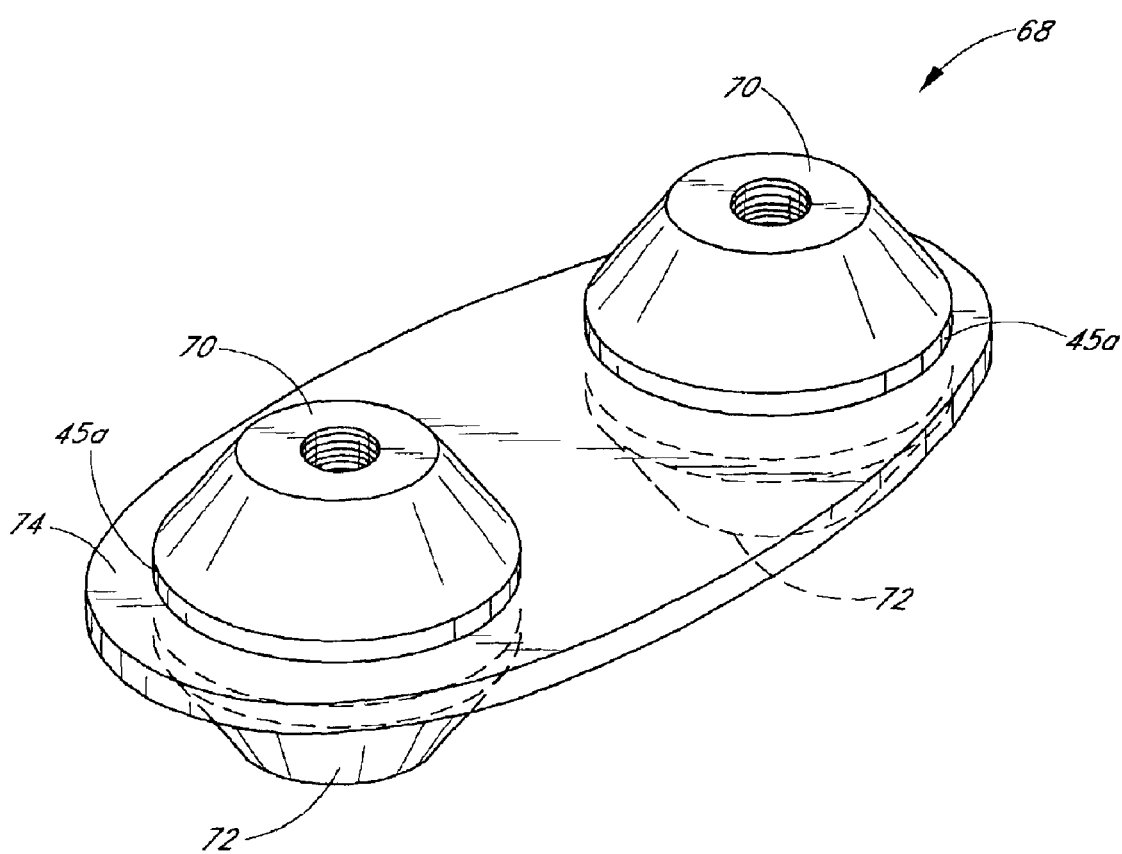
FIG. 4 is a preferred embodiment of a dual connector.
Figure 5:
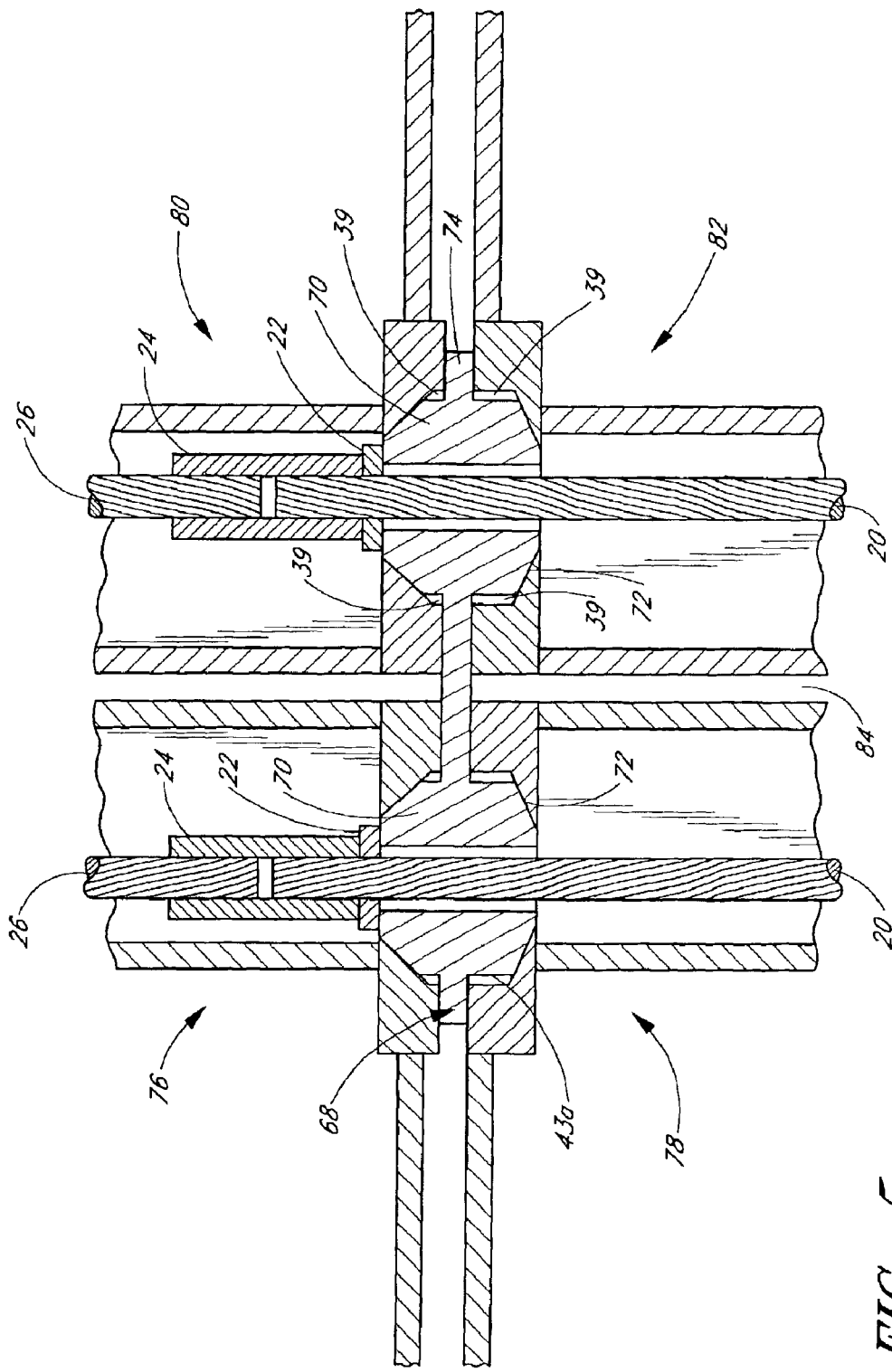
FIG. 5 is a cross-sectional view of a building connection system including the dual connector of FIG. 4.

With reference now to FIGS. 4 and 5, a preferred embodiment of a dual connector 68 is shown. In the embodiment illustrated, the connector 68 has two conical upper portions 70 and vertical portions 45*a*, two conical lower portions 72 and lower portions 43*a*, and a single flange 74. In FIG. 5, the connector 68 is shown positioned at a junction of four different building modules 76, 78, 80, 82. The connector is assembled with connecting rods 20, 26, coupler nuts 24, and washers 22 as described in the embodiment of FIGS. 1–3.

As will be appreciated by those skilled in the art, the dual connector 68 transmits lateral forces between the modules 76, 78 on the left and the modules 80, 82 on the right. As a result, relative movement between the modules 76, 78 on the left and the modules 80, 82 on the right is advantageously controlled. Other multiple connectors (not shown) having, for example, three, four or even more conical upper and lower portion pairs can advantageously be used at various other locations of the building (e.g., at corner junctions of modules, at the edges of corridors, and the like) to control relative movement between adjacent modules.

Although the invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. It is further contemplated that various combinations and sub-combinations of the specific features and aspects of the embodiments may be made and still fall within the scope of the invention. It is intended that the scope of the present invention herein disclosed should not be limited by the particular disclosed embodiments described above, but should be determined only by a fair reading of the claims that follow.

It should be noted that certain objects and advantages of the invention have been described above for the purpose of describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

I claim:

1. A building construction, comprising:
    a first pair of building structural members;
    a first connector positioned between the first pair of structural members, the first connector comprising an upper portion defining an upper bearing surface, a lower portion defining a lower bearing surface, a flange extending outwardly from the first connector between the first pair of structural members, and a bore extending axially through the first connector from the upper portion to the lower portion;
    a second pair of building structural members above the first pair of structural members;
    a second connector positioned between the second pair of structural members in axial alignment with the first connector, the second connector comprising an upper portion defining an upper bearing surface, a lower portion defining a lower bearing surface, a flange extending outwardly between the second pair of structural members, and a bore extending axially through the second connector from the upper portion to the lower portion, at least one of the upper bearing surface and the lower bearing surface of the second connector having a greater slope than the corresponding upper bearing surface or lower bearing surface of the first connector;
    a tensioner extending through the bore of the first connector and the bore of the second connector.

2. The building construction of claim 1, wherein the slope of at least one of the bearing surfaces of the first connector is less than the slope of the corresponding bearing surface of the second connector.

3. The building construction of claim 2, wherein the slope of the lower bearing surface of the first connector is less than the slope of the lower bearing surface of the second connector.

4. The building construction of claim 3, wherein the slope of the upper bearing surface of the first connector is approximately the same as the slope of the upper bearing surface of the second connector.

5. The building construction of claim 4, wherein the slope of the upper bearing surfaces of the first and second connectors is approximately 45°.

6. The building construction of claim 5, wherein the slope of the lower bearing surface of the first connector is less than 45°.

7. The building construction of claim 6, wherein one of the building structural members is common to both the first pair of structural members and the second pair of structural members.

8. A building construction, comprising:
    a plurality of connectors, each of the connectors having an upper portion, a lower portion, a flange extending outwardly between the upper portion and the lower portion, and an axial bore extending through the connector from the upper portion to the lower portion, the upper portion and the lower portion defining sloped bearing surfaces, the bearing surfaces of at least two of the connectors having different slopes;
    a plurality of building structural members, the connectors being positioned between the structural members, the upper and lower portions of the connectors extending into recesses in the structural members having sloped walls corresponding to the sloped bearing surfaces of the connectors; and
    a tensioner extending through the bores of the connectors to connect the structural members.

9. The building construction of claim 8, wherein the upper and lower portions of the connectors are generally conical.

10. The building construction of claim 9, wherein the slopes of the bearing surfaces of the connectors generally increases from a bottom of the building construction to a top of the building construction.

11. The building construction of claim 10, wherein the tensioner comprises a plurality of threaded rods interconnected by coupler nuts.

12. The building construction of claim 11, wherein the structural members comprise tubes through which the threaded rods extend and plates welded to the ends of the tubes, the recesses being formed in the plates.

13. The building construction of claim 12, wherein at least one of the connectors is a multiple connector, comprising at least two upper portions and at least two lower portions.

14. A building construction, comprising:
a plurality of building structural members;
a plurality of connectors in vertical alignment between the structural members, each of the connectors having an upper portion defining a sloped upper bearing surface, a lower portion defining a sloped lower bearing surface, a flange extending outwardly between the upper portion and the lower portion, and an axial bore, the slopes of at least one of the upper bearing surfaces and the lower bearing surfaces of the connectors progressively increasing from a bottom one of the connectors to a top one of the connectors; and
a tensioner extending through the bores of the connectors.

15. The building construction of claim 14, wherein the slopes of the lower bearing surfaces of the connectors progressively increase from the bottom connector to the top connector.

16. The method of claim 14, further comprising determining which of the connectors to position between which of the structural members based upon the slopes of the bearing surfaces of the connectors prior to positioning the connectors between the structural members.

17. The method of claim 16, wherein the determining comprises computer modeling of the building.

18. A method of constructing a building, comprising:
positioning a plurality of connectors between a plurality of structural members of the building, each of the connectors having an upper portion, a lower portion, a flange extending outwardly between the upper portion and the lower portion, and an axial bore, each of the upper and lower portions defining a sloped bearing surface, the bearing surfaces of some of the connectors having different slopes than the bearing surfaces of other connectors; and
providing tensioners through the bores of the connectors to connect the structural members.

* * * * *